United States Patent [19]

Bott et al.

[11] Patent Number: 4,838,467
[45] Date of Patent: Jun. 13, 1989

[54] MOLDED PLASTIC LUGGAGE CARRIER CONSTRUCTION

[76] Inventors: John A. Bott, 931 Lakeshore Dr., Grosse Pointe Shores, Mich. 48236; John S. Cucheran, 1069 Inca Trail, Lake Orion, Mich. 48035

[21] Appl. No.: 11,430

[22] Filed: Feb. 2, 1987

Related U.S. Application Data

[63] Continuation of Ser. No. 879,534, Jun. 23, 1986, abandoned, which is a continuation of Ser. No. 672,125, Nov. 16, 1984, abandoned.

[51] Int. Cl.⁴ .................................................. B60R 9/00
[52] U.S. Cl. ..................................... 224/326; 224/325; 410/12
[58] Field of Search ............... 224/309, 316, 321, 324, 224/325, 326, 327; 114/204, 112; 410/104, 12; 296/37.7, 3

[56] References Cited

U.S. PATENT DOCUMENTS

| 3,330,454 | 7/1967 | Bott | 224/326 X |
| 3,623,642 | 11/1971 | Stephen | 224/325 |
| 3,724,730 | 4/1973 | Olsen et al. | 224/309 |
| 3,841,235 | 10/1974 | Wheeler et al. | 410/12 |
| 4,099,658 | 7/1978 | Bott | 224/326 |
| 4,501,386 | 2/1985 | Rasor et al. | 224/326 |

Primary Examiner—Renee S. Luebke
Attorney, Agent, or Firm—Harness, Dickey & Pierce

[57] ABSTRACT

An article carrier for a motor vehicle comprising at least one generally horizontally arranged molded plastic article supporting slat capable of being fixedly secured to the vehicle and having an end cap mechanism and/or a bracket for supporting a cross rail or the like integrally formed into the slat. The end cap mechanism may include a tie down for securing articles to be supported by the slat. The slat may have a channel and an insert may be placed in the channel for resilient but sturdy support of articles placed on the slat. The slat and the article carrier may be of various forms.

25 Claims, 2 Drawing Sheets

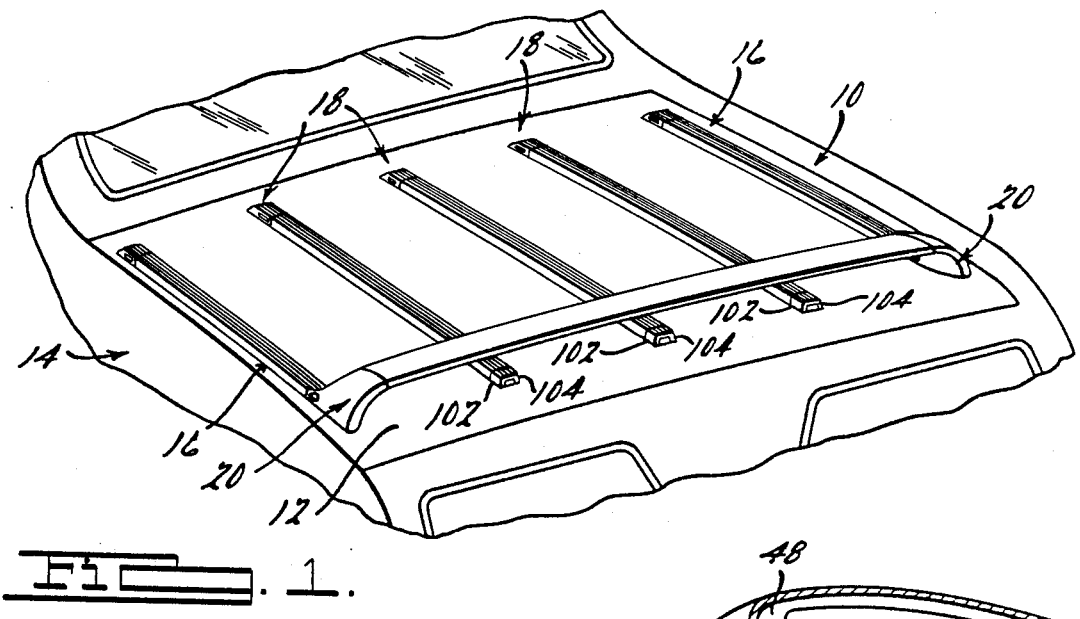
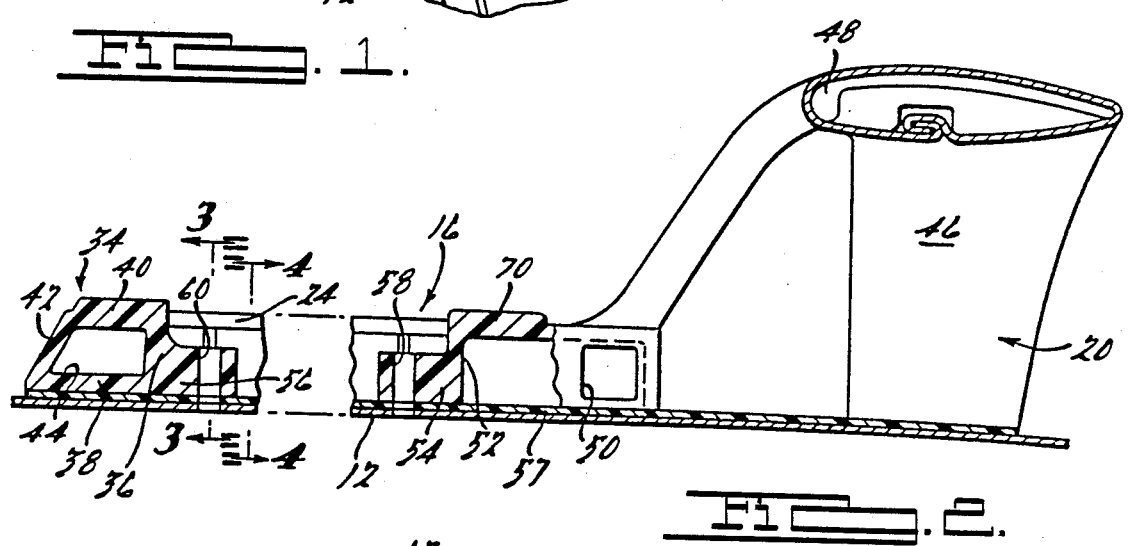
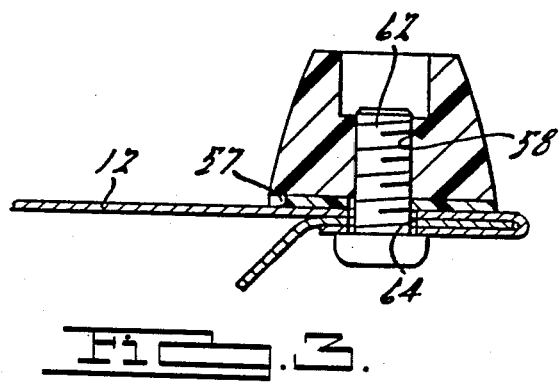
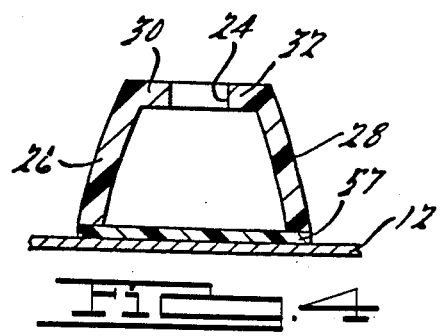

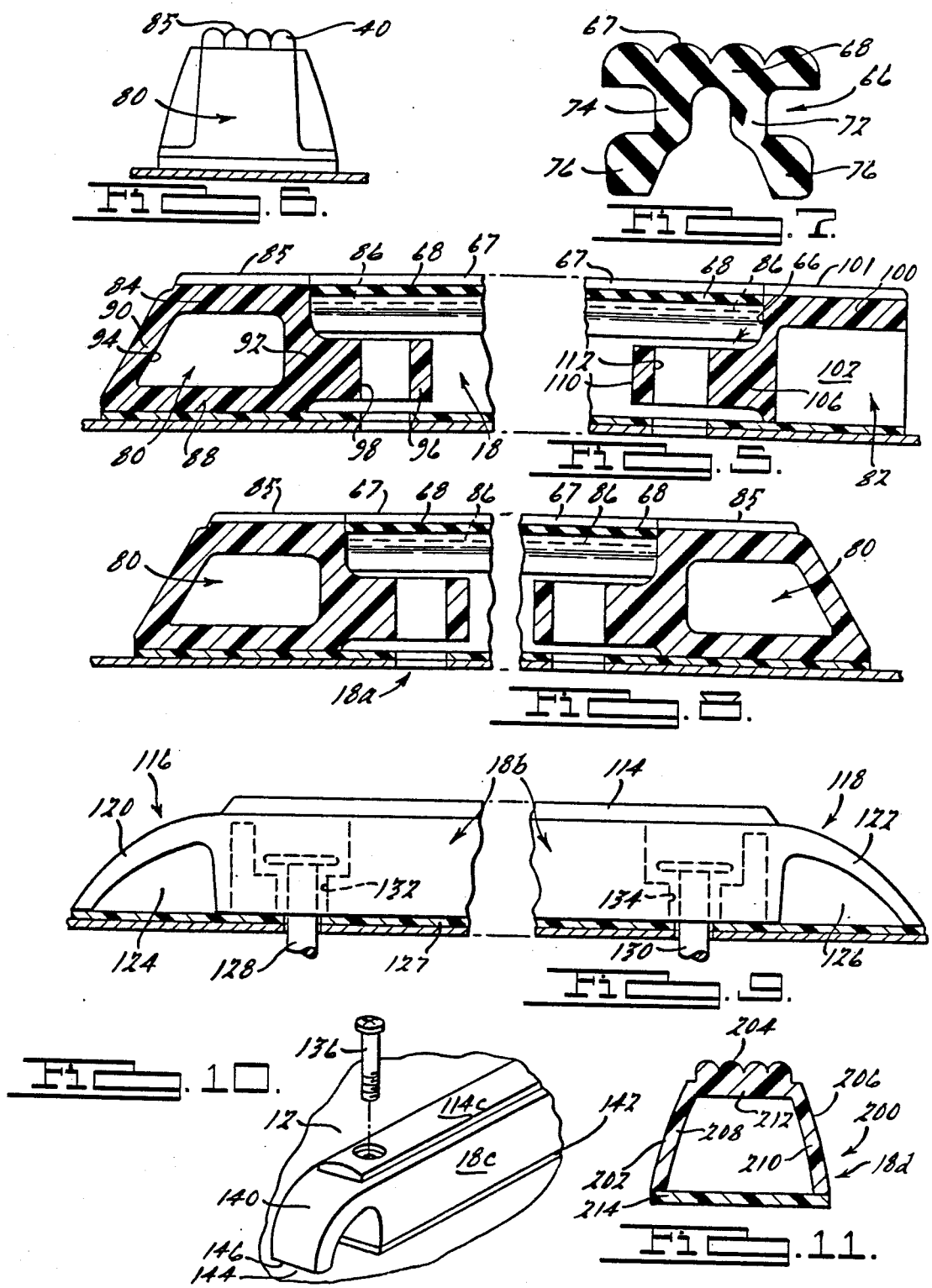

MOLDED PLASTIC LUGGAGE CARRIER CONSTRUCTION

This application is a continuation of application Ser. No. 879,534, filed June 23, 1986, now abandoned whch is a continuation of Ser. No. 672,125 filed Nov. 16, 1984, now abandoned.

BACKGROUND AND SUMMARY OF THE INVENTION

The present invention relates generally to vehicle luggage carriers and more particularly to a new and improved vehicle luggage carrier which is securable to the deck lid or similar horizontally extending planar surface of a vehicle to secure articles to the carrier for transportation by the vehicle.

Slat-type lugge carriers such as those disclosed in, for example, applicant's prior U.S. Pat. Nos. 4,099,658, 4,182,471, 4,239,139, 4,295,587, 4,364,500, 4,427,141, 4,440,333, 4,431,123, and 4,432,478 have currently found favor among purchasers of automobiles due to their aesthetically appealing appearance and high degree of functionality as an accessory to carry additional cargo on an automotive vehicle to make the passenger compartment of the vehicle more comfortable for the driver and passengers in that compartment. The luggage carriers of the prior art comprise a series of low profile metal slats which reinforce the roof or deck lid, have upper article supporting surfaces to support cargo or luggage spaced from the vehicle surface, and may have additional tie down functions or functions to attach additional accessories to channels within the slats fastened thereto by various fastening mechanisms. The slats may also have end caps fastened to the slats which end caps have either a tie down mechanism, an abutment mechanism, or both. An insert may also be placed in the channel of the metal slat to provide a resilient member upon which cargo or luggage can be set upon the slats secured to the vehicle.

The present invention improves upon the slat-type luggage carriers and provides a one piece molded plastic element which includes all of the functions of the end cap (and/or bracket) and the slat in a one piece construction. Not only is such a construction an improvement from the standpoint of durability and weight requirements, but also the aesthetic appealability of the luggage carrier can be improved since the plastic may be formed in a much greater variety of shapes and sizes and also may be provided in a substantial variety of colors. The one piece slat combines the functions of the end cap or bracket in a manner that either an abutment surface and tie down, only an abutment surface, or only a tie down may be employed as desired in the manufacture of the slat. Further, the present invention also includes the integration of a bracket with the slat to which elevated cross rails and the like can be attached. The slat may also be channelled with an insert disposed in the channel to provide a resilient support surface that also constitutes to the structural rigidity of the slat.

The one piece nature of the slat construction is further advantageous from the assembly standpoint of the luggage carrier on the vehicle since fewer parts will be needed to provide the same functional luggage carrier. The bracket may or may not also have integrated tie down means associated with it.

It is a further object of the present invention to provide a new and improved luggage carrier of the above described type that is extremely pleasing in appearance, rugged and durable in construction, economically manufactured, and having a long and effective operational life.

Other objects and advantages of the present invention will become apparent from the following detailed description taken in conjunction with the accompanying drawings.

BREIF DESCRIPTION OF THE DRAWINGS

FIG. 1 is an elevated perspective view of a luggage carrier including the slat of the present invention;

FIG. 2 is a side sectional view, partially in elevation, of one of the outer most slats of FIG. 1;

FIG. 3 is a front cross sectional view along the lines 3—3 of FIG. 2;

FIG. 4 is a front cross sectional view along the lines 4—4 of FIG. 2;

FIG. 5 is a side elevational view of one of the intermediate slats of FIG. 1;

FIG. 6 is a front end view of the slat of FIG. 5;

FIG. 7 is a cross sectinal view of the insert placed within the slats of FIGS. 1 to 6;

FIG. 8 is an alternative interior slat similar to FIG. 5;

FIG. 9 is a further alternative of a slat similar to FIG. 5;

FIG. 10 is an end perspective view of the slat of FIG. 9 as mounted on a vehicle; and FIG. 11 is a vertical cross sectional view of a further alternative of a slat having an exterior surface profile as that illustrated in FIGS. 1, 4, 5, 6, 7, or 8.

DETAILED DESCRIPTION OF THE PREFERRD EMBODIMENTS

Referring to FIG. 1, a luggage carrier 10 is shown mounted to the rear deck lid 12 of a vehicle 14. The luggage carrier 10 comprises a series of two outer slats 16, one on each side of the longitudinal axis of the vehicle 14, and three intermediate slats 18.

The outer slat elements 16 are one piece molded plastic parts which include a channel 24 formed by two upwardly directed sidewalls 26 and 28 and, optionally two flanges 30 and 32 opposing one another to form the channel 24, as shown in cross section in FIG. 4. Further, the slat element 16 includes an integrally formed tie down 34 comprised of an end portion 36 closing off the channel 24, a bottom portion 38, an upper portion 40, and a connecting portion 42, all of which portions 36, 38, 40, and 42 combined to form a recess 44 into which means for tying down articles such as ropes, hooked bungee cords, and the like may be inserted.

At the opposite end of the slat element 16, a bracket 20 is integrally formed as part of the slat element 16 and includes a base portion 46 and an extended portion 48, which extended portion fits telescopically into a hollow cross rail 22 and is secured together by a screw or other conventional fstener. A second tie down element may optionally be placed within or adjacent the bracket 20, such as recess 50. The bracket 20 further comprises an end closure portion 52 which closes off the channel 24 at the opposite end from the end closure element 36 of the tie down 34.

Referring to FIG. 3, the slat element 16 includes solid cross sectional portions 54 and 56 through which a bore is disposed as shown by bores 58 and 60, respectively. As illustrated in FIG. 3, a fastener such as screw fastener 62 is disposed from below the surface of the deck lid 12 through a hole 64 in the deck lid 12 into threaded engagement with the bores 58 or 60 of the slat element 16 at the solid cross sectional portion 54 or 56 to engage the slat element with the deck lid 12. If desired, a suitable threaded female fastener element or "nut" (not shown) could be molded, as by conventional "insert molding" techniques, within the slat element 16 and be threadably engaged by the screw fastener 62 for securing the slat element 16 upon the deck lid 12. Optionally, a pad 57 may be placed beween the slat element 16 and the deck lid 12 as shown to diminish any marring of the painted surface of the deck lid 12.

As illustrated in FIG. 7, an insert 66 is disposed within the channel 24 of the slat element 16. It is preferable that the insert 66 when placed in the channel 24 be positioned such that the upper supporting surface 67 of the upper portion 68 of the insert lie in the same plane as the elevated upper surface portion 40 of the tie down and the upper surface portion 70 of the bracket interface with the slat element 16. The insert 66 includes a pair of deformable longitudinally extending flanges 72 and 74 which each have an extended portion 76 or 78, respectively, to lock the insert into the slat element 16 within the channel 24, and structurally support the slat element 16 from movement of the sidewalls 26 and 28 toward one another when a load is placed on the carrier 14. The sidewalls 26 and 28 are curved inwardly in FIG. 4 to act against the insert 66 for support. The cross section of the insert may have to be modified slightly at the areas along the length of the slat where the cross section of the slat is similar to FIG. 3 at which portions the extended portions 76 and 78 may be either cut away, molded with recessed areas, or otherwise made to conform to that portion of the slat.

The intermediate slat elements 18 are similarly constructed as a one piece injection molded plastic slat element. The slat element 18 has a cross section generally as that represented in FIG. 4 and described above. As illustrated in FIG. 5, a tie down 80 is disposed at one end of the slat element 18 and a closure end portion 82 is disposed at the opposite end of the slat element 18. Each end of the slat element 18 may have identical tie downs (FIG. 8), different end portions at each end of the slat (FIG. 5), or, optionally, may have one end having a certain type of tie down and the other having a different shape or type of tie down. The tie down 80 comprises an upper portion 84 which has a configuration matching the upper design configuration 68 of the insert 66 which is placed into the channel 86 of the slat element 18 and having an upper surface 85 co-planar with the upper supporting plane or surface 67 of the insert 68. The tie down 80 further comprises a lower element 88 and vertically extending inclined end element 90 and a vertically extending end closure element 92 which closes off the end of the channel 86. The elements 84, 88, 90, and 92 combine to form a recess 94 within which elements for typing down articles to be placed on the carrier can be inserted. The end portion 92 includes an extended solid cross sectional portion 96 having a threaded bore 98 (formed either directly with the end portion 92 or provided by means of the aforementioned insert molded female fastening element (not shown)) therein to mate with a fastener as shown in FIG. 3. At the opposite extreme of the slat element 18 is the closure end portion 82 which again has an upper element 100 having a design mating with the upper design 68 of the insert 66 and has an upper support plane or surface 101 co-planar with the upper support surface or plane 67 of the insert 66. The end portion 82 also includes two sidewalls 102 and 104 (FIG. 1) and a vertically disposed end wall 106. Similarly, a solid cross section extended portion 110 having a threaded bore 112 (formed either directly within the end portion 82 or provided by an insert molded nut or the like), within the portion is disposed within the slat element 18 to secure the slat element to the vehicle similar to FIG. 3 by means of a suitable fastener.

FIG. 9 discloses a further alternative of an intermediate slat element 18b comprising a one piece molded plastic element having a removable insert 114 upon which articles may be rested, and having tie downs 116 and 118 disposed one at each end of slat element 18b. The tie downs 116 and 118 comprise an extended hook portion 120 and 122 integrated into the slat element and forming a recess 124 and 126 with the deck lid 12 or a pad 127 mounted to the deck lid 12. The slat element 18b may be secured by suitable hidden fasteners such as the rivets 128 and 130 covered by the insert 114 disposed in suitable bores 132 and 134 respectvely, as shown in FIG. 9, or may be secured by a bolt 136 insertable into a suitable fastening device such as a "Riv-Nut" threaded blind fastener or the like disposed in a bore in the deck 12 of the vehicle, such as the construction illustrated by yet a further alternative embodiment in Figure 10. The embodiment of FIG. 10 includes a one piece molded plastic slat 18c with a modified insert 114c having an extended hook 140 as a tie down mechanism extending from at least one end thereof. A pad element 142 only extends up to the base of the tie down mechanism, however, such that a small space or opening 144 exists between the deck lid 12 and the outer edge 146 of the hook 140.

FIG. 11 discloses yet another alternative slat 200 embodiment within the scope of the present invention where the outer surfaces 202, 204, and 206 have the identical shape of a slat 18 with an insert 66 disposed therein as set forth in FIGS. 1 to 6 or FIG. 8, but the slat 18d is molded out of plastic as on piece with no insert and no channel. The slat 18d includes aperture accommodations for suiatble fasteners similar to the fastening mechanism shown in FIG. 10. The slat 18d has two sidewalls 208 and 210 and a top wall 212, and would be optionally mounted onto a pad 214 to sit on the vehicle surface as part of the assembly of the luggage carrier 10 of FIG. 1.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. An article carrier for mounting on a planar surface of a motor vehicle comprising at least one generally horizontally arranged article supporting slat having two end portions, an upward opening channel extending longitudinally thereof, said channel being defined by at least two sidewalls, and means for fixedly mounting said slat to said surface, said slat including at one end thereof integrally formed means for typing down articles to be carried, said tie down means being formed as a monolithic piece of material with said channel in the formation of said slat.

2. The carrier in accordance with claim 1 further comprising a lingitudinally extending load supporting member insertable within said channel.

3. The carrier in accordance with claim 1 which includes a plurality of generally parallel article supporting slats fabricated of a plastic material.

4. The carrier in accordance with claim 1 wherein said slat has integrally formed means in at least two positions along the length of said slat for typing down articles to be carried.

5. The carrier in accordance with claim 1 wherein said channel further comprises a pair of inwardly directed flanges each integrally formed with a respective sidewall.

6. The carrier in accordance with claim 1 wherein said tying down means comprises a hook portion at the end of said slat.

7. The carrier in accordance with claim 6 wherein said hook portion has a terminal end which extends toward and is spaced from said planar surface of said motor vehicle.

8. An article carrier for mounting on a planar exterior surface of a motor vehicle comprising at least one generally longitudinally arranged article supporting slat having two end portions, an upward opening channel extending longitudinally thereof, said channel being defined by at least two sidewalls, and means for fixedly mounting said slat to said surface, said slat including at one end thereof a bracket for supporting additional article carrier elements monolithically formed with said slat wherein said channel and said bracket comprise a one piece element as a continuous piece of material.

9. The carrier in accordance with claim 8 wherein said slat further comprises integrally formed tie down means for articles to be carried on said vehicle.

10. The carrier in accordance with claim 9 wherein said tie down means is disposed at one end of said slat opposite from the bracket.

11. The carrier in accordance with claim 9 wherein said tie down means is disposed adjacent said bracket.

12. The carrier in accordance with claim 9 wherein said tie down means is disposed within said bracket.

13. The carrier in accordance with claim 8 wherein said slat includes means for fixedly securing said slat to said vehicle wherein said securing means includes an element disposed below said surface.

14. The carrier in accordance with claim 13 wherein said means for fixedly securing includes a portion integral with said slat extending from one sidewall to the other having a bore into which fastener means is disposeable.

15. The carrier in accordance with claim 8 further comprising an insert disposed within said channel, said insert having an upper article supporting surface.

16. The carrier in accordance with claim 15 wherein said slat further comprises an integrally formed raised end portion.

17. The carrier in accordance with claim 16 wherein said end portion has an upper surface and said upper surface of said raised end portion is co-planar with said upper surface of said insert when said inset is disposed within said channel.

18. The carrier in accordance with claim 8 wherein at least one of said end portions comprises a hook portion at the end of said slat.

19. The carrier in accordance with claim 18 wherein said hook portion has a terminal end thereof which extends toward and is spaced from said planar surface of said motor vehicle.

20. An article carrier for the trunk lid of an automobile, said trunk lid extending horizontally as an exterior body surface and having a leading edge, a trailing edge, and laterally disposed side edges, said article carrier including a plurality of parallel slats fixedly secured on said horizontally extending exterior body surface, extending from adjacent said leading edge to adjacent said trailing edge, and lying closely against said surface in a low profile configuration throughout the entire length of said slat, the carrier comprising two laterally outermost slats and at least one inner slat, and each said slat including a plurality of separate base portions extending laterally across said slat; and upper article supporting surface extending the length thereof; a bracket integrally secured to the two laterally outermost slats disposeable adjacent said side edges at the end of said slats adjacent the trailing edge of said body surface; an elevated restraining bar supported by said brackets and extending laterally across said slats and said body surface; and integral tie down means directly fixedly secured to said body surface and formed as a common piece of material and a monolithic element with at least the intermediate slats of said carrier to restrain articles disposed on said slats substantially out of contact with said body surface, said tie down means disposed at least at the end portions of said slats adjacent the leading edge of said body surface.

21. The article carrier in accordance with claim 20 wherein each said slat is made of plastic.

22. A vehicle article carrier for mounting on a planar surface of a motor vehicle comprising at least one generally horizontally arranged molded plastic article supporting slat having at least one upper article supporting surface extending longitudinally thereof and at least two sidewalls, said slat including at at least one end thereof monolithically formed means for typing down articles to be carried commonly formed with said sidewalls as a single piece of material.

23. An article carrier for mounting on a planar exterior surface of a motor vehicle comprising at least one generally horizontally arranged molded plastic article supporting slat having two end portions, at least one upper article supporting surface extending longitudnally thereof, base portions, means for fixedly mounting said slat to said surface, and at least two sidewalls, said slat includng at at least one end thereof an integrally formed end portion, said end portion and said sidewalls comprising a monolithic element of continuous material.

24. A vehicle article carrier for mounting on a planar surface of a motor vehicle comprising at least one generally horizontally arranged article supporting slat having two end portions, an upward opening channel extending longitudinally thereof, said channel being defined by at least two sidewalls, and a plurality of base portions extending laterally across said slat and interfacing with said surface for mounting said slat to said surface, said slat including proximate one end portion thereof, a monolithically formed tie down for articles to be carried on said carrier.

25. A vehicle article carrier for mounting on a planar surface of a motor vehicle comprising at least one generally longitudinally arranged article supporting slat having two end portions, an upward opening channel extending longitudinally thereof, said channel being defined by at least two sidewalls, and at least two base portions, said slat including proximate one end portion thereof a monlithically formed bracket for supporting additional article carrier elements, said carrier including means for mounting said slat to said surface at said base portions.

* * * * *

UNITED STATES PATENT AND TRADEMARK OFFICE
CERTIFICATE OF CORRECTION

PATENT NO. : 4,838,467

DATED : June 13, 1989

INVENTOR(S) : John A. Bott

It is certified that error appears in the above-identified patent and that said Letters Patent is hereby corrected as shown below:

Column 2, line 22,
"sectinal" should be --sectional--

Column 2, line 32,
"PREFERRD" should be --PREFERRED--

Column 2, line 57,
"fstener" should be --fastener--

Column 4, line 39,
"on" should be --one--

Column 4, line 41,
"suiatble" should be --suitable--

Column 4, line 62, claim 1,
claim 1),
"typing" should be --tying--

Column 4, line 67, claim 2,
"lingitudinally" should be --longitudinally--

UNITED STATES PATENT AND TRADEMARK OFFICE
CERTIFICATE OF CORRECTION

PATENT NO. : 4,838,467

DATED : June 13, 1989

INVENTOR(S) : John A. Bott

It is certified that error appears in the above-identified patent and that said Letters Patent is hereby corrected as shown below:

Column 5, line 6, claim 4,
"typing" should be --tying--

Column 5, line 57, claim 17,
"inset" should be --insert--

Column 6, line 32, claim 22,
line 6, claim 24),
delete "at" (second occurrence)

Column 6, line 33, claim 22,
line 7, claim 24),
"typing" should be --tying--

Column 6, line 42, claim 23,
line 6, claim 25),
delete "at" (second occurrence)

Signed and Sealed this

Twenty-first Day of August, 1990

Attest:

HARRY F. MANBECK, JR.

Attesting Officer

Commissioner of Patents and Trademarks